Patented July 8, 1952

2,602,790

UNITED STATES PATENT OFFICE 2,602,790

MONO-N-HETEROCYCLIC DERIVATIVES OF 4,4'-DIAMINODIPHENYLSULFONE

Edward D. Amstutz, Bethlehem, Pa., assignor to The Wm. S. Merrell Company, Cincinnati, Ohio, a corporation of Delaware No Drawing. Application March 18, 1947, Serial No. 735,550

8 Claims. (Cl. 260—239.6)

This invention relates to a new class of chemical compounds of therapeutic value. The new compounds are mono-N-heterocyclic derivatives of 4,4'-diaminodiphenylsulfone and may be represented by the type formula:

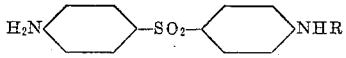

in which R is a heterocyclic radical containing one or more nitrogen heteroatoms, or containing nitrogen and sulfur heteroatoms.

The new compounds are of value in the treatment of bacterial infections, particularly infections such as tuberculosis and leprosy. Certain bis-N-heterocyclic derivatives of 4,4'-diaminodiphenylsulfone have been prepared, but have proved inactive towards streptococcal and pneumococcal infections in mice. By contrast it has been found that the mono-N-heterocyclic derivatives of 4,4'-diaminodiphenylsulfone possess antibacterial properties. Accordingly, the presence of a free para-amino group, or at least a para group readily convertible in the animal body to an amino group, is believed necessary for antibacterial activity.

The new compounds may be prepared in a step-wise process starting with the condensation of p-nitrochlorobenzene with the potassium salts of p-bromo- or p-iodothiophenol. The resulting 4-halo-4'-nitrodiphenylsulfides are oxidized to the corresponding sulfones by such oxidizing means as hydrogen peroxide in acetic acid solution. In the case of the iodo compound, however, it may be desirable to use chromic anhydride as an oxidizing agent because of the tendency of the iodo compound to catalyze the decomposition of hydrogen peroxide with resulting fluctuation in yield. The 4-halo-4'-nitrodiphenylsulfones are conveniently reduced to the corresponding 4-halo-4'-aminodiphenylsulfones by means of stannous chloride and hydrogen chloride in acetic acid solution. Condensation of the halo-amino compound with a halo-heterocycle, preferably a bromo-heterocycle, followed by amination, produces the desired mono-N-heterocyclic derivative of 4,4'-diphenyldiaminosulfone.

The halogen of the 4-halo-4'-aminodiphenylsulfone may be directly replaced by condensation with the desired amino-heterocycle in the case of the iodo compound, but the bromo compound appears less reactive. Also with amino heterocycles such as 2-aminopyridine which form tautomeric imino compounds, the reaction of the halo-heterocycle and the 4-halo-4'-aminodiphenylsulfone, with subsequent amination, is preferred.

The mono-N-heterocyclic derivatives may also be prepared by amination of the 4-halo-4'-nitrodiphenylsulfones to produce 4-amino-4'-nitrodiphenylsulfone. This compound is condensed with a halo-heterocycle to produce a 4-nitro-4'-heterocyclic aminodiphenylsulfone, which is reduced by means of stannous chloride and hydrogen chloride in a solution of acetic acid to the corresponding mono-N-heterocyclic derivative.

In general, the new compounds are crystalline solids of relatively high melting point, and are soluble in dilute mineral acids. They may be administered either as such or in the form of acid addition salts. Ordinarily they will be administered orally, e. g. in tablet or capsule form. For this purpose sodium bicarbonate may be compounded with them to increase stability and solubility in the digestive tract. They may also be administered parenterally in water-soluble form, e. g., as water-soluble derivatives prepared by compounding with an aldehyde or aldose bisulfite or sulfoxylate, e. g. sodium formaldehyde sulfoxylate.

Among the mono-N-heterocyclic derivatives of 4,4'-diaminodiphenylsulfone included within this invention are compounds where the heterocyclic radical is pyridyl, pyrimidyl, pyrazyl, pyridazyl, thiazolyl, pyrazolyl, piperazyl, triazyl, triazolyl, tetrazolyl, and quinolyl. The structural isomers of these heterocyclic radicals and their methyl homologues are likewise suitable for the purposes of this invention. The hydrogens of one or more of the carbon atoms of the heterocyclic structures may be replaced to form homologues, and the linkage of the heterocycle and the 4,4'-diaminodiphenylsulfone may be effected at positions depending on the configuration of the individual heterocycle. For example, pyridine has five available carbon atoms, but the "2-" and "6-" derivatives, or the "3-" and "5-" derivatives are identical due to the symmetrical relation of these positions; and with the thiazoles, the available positions are determined by the possible configurational relation of the carbons to the heteroatoms, as for example, "3-", "4-", and "5-" in the case of orthothiazole, and "2-", "4-", and "5-" in the case of metathiazole.

The following examples are illustrative of the compounds that are included in the invention, and it will be apparent to the chemist that the other members of the class may be prepared from equivalent heterocycles by analogous methods.

EXAMPLE I

A.—*Preparation of 4-iodo-4'-nitrodiphenylsulfide,* $C_{12}H_8O_2NSI$

A mixture of 28.4 g. (0.12 mole) of p-iodothiophenol, 17.4 g. (0.11 mole) of p-nitrochlorobenzene, 15.0 g. (0.15 mole) of potassium bicarbonate, and 250 ml. of ethanol was refluxed for twenty-three hours and about two-thirds of the solvent was then removed by distillation. The residue was diluted with 600 ml. of water and the resultant yellow precipitate was collected, washed with sodium hydroxide solution and with water, and recrystallized from ethanol to yield 30.2 g. (77%) of bright yellow crystals, melting at 92–96° C. Another recrystallization from ethanol raised the melting point to 101–102° C.

*4 - Bromo-4'-nitrodiphenylsulfide.*—A mixture of 18.8 g. (0.10 mole) of p-bromothiophenol, 15.7 g. (0.099 mole) of p-nitrochlorobenzene, 12.0 g. (0.12 mole) of potassium bicarbonate, and 200 ml. of ethanol was treated as above. Recrystallization of the crude product from ethanol afforded 26.5 g. (86%) of bright yellow crystals melting at 92–94° C.

B.—*Preparation of 4-iodo-4'-nitrodiphenylsulfone,* $C_{12}H_8O_4NSI$

A mixture of 29.5 g. (0.083 mole) of 4-iodo-4'-nitrodiphenylsulfide, 38 ml. (0.336 mole) of 30% hydrogen peroxide, and 180 ml. of glacial acetic acid was heated cautiously until a strongly exothermic reaction began. After this reaction, which required occasional cooling by means of a water bath, had subsided, the mixture was refluxed for two hours, cooled to room temperature and filtered. The white crystalline product melted at 204–206° C. and required no further purification; yield, 30.0 g. (93%).

*4-Bromo-4'-nitrodiphenylsulfone.*—This compound was prepared from 4-bromo-4'-nitrodiphenylsulfide as in the case of the corresponding iodo compound above. The crude product was purified by digestion with hot ethanol, in which it is only slightly soluble. The product was obtained as white crystals; M. P. 180–182° C.; yield, 95%.

C.—*Preparation of 4-iodo-4'-aminodiphenylsulfone,* $C_{12}H_{10}O_2NSI$

A solution of stannous chloride and hydrogen chloride in acetic acid was prepared from 59.0 g. (0.261 mole) of stannous chloride dihydrate and 250 ml. of glacial acetic acid by bubbling anhydrous hydrogen chloride into the mixture until a clear solution was obtained. This solution was added gradually over a twenty-minute period to a mechanically stirred suspension of 29.0 g. (0.075 mole) of 4-iodo-4'-nitrodiphenylsulfone in 90 ml. of glacial acetic acid maintained at 80–85° C. Stirring was continued at this temperature for another ninety minutes and the mixture was cooled and poured into 2 liters of water. The gelatinous white precipitate was collected, washed with 10% sodium hydroxide solution to decompose the tin complex, and dried. Recrystallization of the crude product from ethanol yielded 21.9 g. (82%) of white micro-crystalline powder, melting at 216° C. Another recrystallization from ethanol raised the melting point to 221.5–223° C.

*4-Bromo-4'-aminodiphenylsulfone.*—This compound was prepared by reduction of 4-bromo-4'-nitrodiphenylsulfone with stannous chloride and hydrogen chloride in acetic acid as above. The product was obtained as colorless needles; M. P. 197–200° C.; yield, 92%.

D.—*Preparation of 4-amino-4'-(N-2-pyrimidyl) aminodiphenylsulfone,* $C_{16}H_{14}O_2N_4S$ A mixture of 3.8 g. (0.0106 mole) of 4-iodo-4'-aminodiphenylsulfone, 11.4 g. (0.12 mole) of 2-amino-pyrimidine, 1.5 g. (0.0108 mole) of finely powdered anhydrous potassium carbonate, and trace of copper powder was heated at 200–210° C. for three hours. The mixture was stirred mechanically and a nitrogen atmosphere was maintained over the melt during the reaction. Upon cooling, the product was a solid vitreous mass. This was ground to a powder and extracted with water to remove the excess 2-amino-pyrimidine and the inorganic salts. The insoluble residue was taken up in 6 N hydrochloric acid (Norit), filtered, and the product was reprecipitated with ammonium hydroxide. An almost quantitative yield (3.3 g. or 95%) of white powder, M. P. 263–268° C. (dec.), was obtained. Another reprecipitation from acid solution raised the melting point to 265–268° C. (dec.).

EXAMPLE II

A.—*Preparation of 4-bromo-4'-(N-2-pyridyl) aminodiphenylsulfone,* $C_{12}H_{13}O_2N_2SBr$ A mixture of 3.6 g. (0.012 mole) of 4-bromo-4'-aminodiphenylsulfone and 12 g. (0.076 mole) of 2-bromopyridine was stirred and heated on an oil bath at 155–160° C. for eight hours. The mixture was cooled, and diluted with a large volume of 50% ethanol. The resultant precipitate was collected by filtration and recrystallized from aqueous ethanol (Norit), affording 2.9 g. (65%) of straw-colored plates, melting at 178–182° C. Another recrystallization from aqueous ethanol afforded colorless needles melting at 180–182° C.

*4-Iodo-4'-(N - 2 - pyridyl) aminodiphenylsulfone.*—This compound was prepared as above from 4-iodo-4'-aminodiphenylsulfone and 2-bromopyridine in a seventy-four per cent yield as colorless crystals, melting at 184–186° C.

B.—*Preparation of 4-amino-4'-(N-2-pyridyl) aminodiphenylsulfone,* $C_{12}H_{15}O_2N_3S$ 4-Bromo-4'-(N-2-pyridyl) aminodiphenylsulfone (2 g., 0.0051 mole) was heated with 12 ml. of 12 N ammonium hydroxide and a trace of copper powder in a sealed tube at 210–220° C. for twenty hours. The contents of the tube were diluted with water and filtered and the insoluble portion was taken up in 5 N nitric acid. Reprecipitation with ammonium hydroxide followed by recrystallization from aqueous ethanol (Norit) afforded 1.3 g. (78%) of colorless needles, melting at 191–194° C. Repeated recrystallizations raised the melting point to 206–207° C. with slight previous sintering. An identical product was obtained in a similar reaction with 4-iodo-4'-(N-2-pyridyl)-aminodiphenylsulfone; yield, 74%.

EXAMPLE III

ALTERNATIVE PREPARATION OF 4-AMINO-4'-(N-2-PYRIDYL) AMINODIPHENYLSULFONE

A.—*Preparation of 4 - nitro - 4' - (N - 2 - pyridyl) amino-diphenylsulfone*

4-Nitro-4'-acetamidodiphenyl sulfone was prepared by the procedure of Ferry, Buck and Baltzly [Org. Syn. 22, 31 (1942)], and immediately hydrolysed with aqueous hydrochloric acid to 4-nitro-4'-amino-diphenylsulfone—yield 21% (on the basis of acetanilide), M. P. 171–173° C.

To 10.3 g. (0.037 mole) of 4-nitro-4'-aminodiphenylsulfone in a 3-neck flask fitted with a mechanical stirrer, thermometer and reflux condenser, was added 11.5 g. (0.074 mole) of 2-bromopyridine. The mixture was heated with continuous agitation at 155-160° in an oil bath for a ½ hour at the end of which time it solidified. The excess bromopyridine was removed with ether and the solid remaining was dissolved in hot alcohol. Upon cooling and neutralization with a 5% solution of sodium carbonate, a yellow precipitate formed, which, after recrystallization from aqueous alcohol and drying over sulfuric acid under reduced pressure, weighed 12.2 g. (93.1%) and melted at 188.5-190°.

B.—*Reduction of 4-nitro-4'-(N-2-pyridyl) aminodiphenylsulfone*

To 200 ml. of 95% ethanol in a 500 ml. 3-neck flask equipped with mechanical stirrer and reflux condenser, were added 12.5 g. (0.035 mole) of 4-nitro-4'-(N-2-pyridyl) aminodiphenylsulfone and 10 g. of activated zinc metal. Hydrochloric acid was added portion-wise to the mixture, with intermittent cooling to prevent overheating until the evolution of hydrogen became vigorous. The solution which soon became practically colorless, was then cooled and diluted to twice its volume with water. The addition of sodium hydroxide solution precipitated a curdy white solid which was freed of zinc hydroxide by several extractions with alcohol and treatments with caustic followed by two acetone extractions. The final product weighed 8.5 g. (75%), melted at 209-211° C. alone and did not depress the melting point of the same substance prepared above.

EXAMPLE IV

A.—*Preparation of 4-nitro-4'-(N-2-thiazolyl)-aminodiphenylsulfone*

A mixture of 27.8 g. (0.10 mole) of 4-nitro-4'-aminodiphenylsulfone and 20.8 g. (0.25 mole of 2-chlorothiazole was heated in an oil bath at 100-105° C. until solidification occurred (about 2½ hours). The product, after having been extracted with pyridine, treated with decolorizing charcoal and precipitated by the addition of water, was digested for three hours in 200 ml. of methanol, in which it is only slightly soluble. The suspension was cooled, and the product was collected and washed with 50 ml. of methanol and 50 ml. of water. After drying, it weighed 33 g. (91.4%) and melted at 247.5-249° C.

B.—*Preparation of 4-amino-4'-(N-2-thiazolyl) aminodiphenylsulfone*

To a warmed (75°) suspension of 33 g. (0.091 mole) of 4-nitro-4'-(N-2-thiazolyl) aminodiphenylsulfone in 500 ml. of glacial acetic acid in a one liter 3-neck flask equipped with stirrer, thermometer and condenser was added a clarified solution of 98.5 g. (0.438 mole) of SnCl₂.2H₂O in 265 ml. of glacial acetic acid. After a three hour period of reaction at 75-85°, the solution was cooled and neutralized below 25° by the addition of a 50% solution of sodium hydroxide. After extraction with concentrated caustic solution, decolorization with charcoal and numerous recrystallizations from aqueous acetone there was obtained 11 g. (37.8%) of colorless crystals melting at 234-237° C. A small portion was recrystallized again from aqueous methanol, which, then melted at 235.6-240.1°.

I claim:

1. Mono-N-heterocyclic derivatives of 4,4'-diaminodiphenylsulfone represented by the type formula:

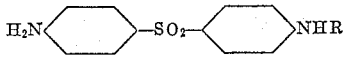

in which R is a nitrogen heterocyclic radical selected from the group consisting of pyridyl, pyrimidyl, pyrazyl, pyridazyl, thiazolyl, pyrazolyl, piperazyl, triazyl, triazolyl, tetrazolyl and quinolyl radicals and the methyl homologues of these radicals, with the radicals being linked to the amino nitrogen atom through a nuclear carbon atom.

2. Mono-N-pyridyl derivatives of 4,4'-diaminodiphenylsulfone represented by the formula:

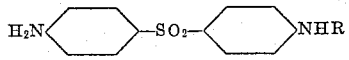

in which R is a pyridyl radical linked to the amino nitrogen through a nuclear carbon atom.

3. Mono-N-diazyl derivatives of 4,4'-diaminodiphenylsulfone represented by the formula:

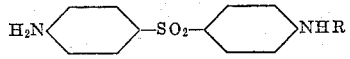

in which R is a diazine radical linked to the amino nitrogen through a nuclear carbon atom.

4. Mono-N-thiazolyl derivatives of 4,4'-diaminodiphenylsulfone represented by the formula:

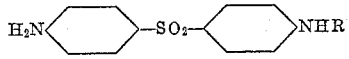

in which R is a thiazole radical linked to the amino nitrogen through a nuclear carbon atom.

5. Mono-N-pyrimidyl derivatives of 4,4'-diaminodiphenylsulfone represented by the formula:

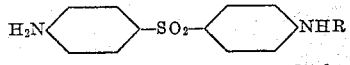

in which R is a pyrimidyl radical linked to the amino nitrogen through a nuclear carbon atom.

6. 4-Amino-4'-(N-2-pyridyl)-aminodiphenylsulfone.

7. 4-Amino-4'-(N-2-pyrimidyl)-aminodiphenylsulfone.

8. 4-Amino-4'-(N-2-thiazolyl)-aminodiphenylsulfone.

EDWARD D. AMSTUTZ.

REFERENCES CITED

The following references are of record in the file of this patent:

UNITED STATES PATENTS

| Number | Name | Date |
| --- | --- | --- |
| 2,192,828 | Daniels | Mar. 5, 1940 |
| 2,331,009 | Tscheche | Oct. 5, 1943 |

OTHER REFERENCES

Proceedings of the Staff Meetings of the Mayo Clinic, vol. 20 (May 30, 1945), pp. 162-166.

Journal of the Chemical Society (London), (1939), p. 1202.

Heymann et al.: J. Am. Chem. Soc. 67, 1986-1990 (1945).

Weislogle et al.: "Survey of Antimalarial Compounds," vol. 2, part 2, p. 1027 (1946).

Northey: The Sulfonamides and Allied Compounds, A. C. S. Monograph Series No. 106, pp. 359 and 621, Reinhold Pub. Co., 330 W. 42nd St., New York, N. Y. Refers to Rosenthal et al., U. S. Public Health Reports, 57, 1534-1542 (1941), U. S. Public Health Service Div. of Fed. Security Agency, 3rd and Independence Ave., S. W., Washington, D. C.